US011725505B2

(12) United States Patent
Chen et al.

(10) Patent No.: US 11,725,505 B2
(45) Date of Patent: *Aug. 15, 2023

(54) MACHINE LEARNING MUD PULSE RECOGNITION NETWORKS

(71) Applicant: Halliburton Energy Services, Inc., Houston, TX (US)

(72) Inventors: Dingding Chen, Tomball, TX (US); Li Gao, Katy, TX (US); Joni Polili Lie, Spring, TX (US); Paravastu Badrinarayanan, Houston, TX (US); Faisal Farooq Shah, Houston, TX (US); Bipin K. Pillai, San Jose, CA (US); Murali Krishna Thottempudi, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,999

(22) Filed: Feb. 7, 2022

(65) Prior Publication Data
US 2022/0195868 A1 Jun. 23, 2022

Related U.S. Application Data

(63) Continuation of application No. 17/131,204, filed on Dec. 22, 2020, now Pat. No. 11,255,187.

(51) Int. Cl.
*E21B 47/18* (2012.01)
*G06N 20/00* (2019.01)

(52) U.S. Cl.
CPC ............. *E21B 47/18* (2013.01); *G06N 20/00* (2019.01)

(58) Field of Classification Search
CPC ..... E21B 47/18; E21B 2200/22; G06N 20/00; G06N 3/08
See application file for complete search history.

(56) References Cited

U.S. PATENT DOCUMENTS

| 7,480,207 | B2 | 1/2009 | Marsh |
| 10,066,481 | B2 | 9/2018 | Switzer et al. |

(Continued)

FOREIGN PATENT DOCUMENTS

WO 2010068870 A2 6/2010

OTHER PUBLICATIONS

Zhang, et al.; "SDA-based Neural Network Approach for MWD Mud Pulse Signal Recognition"; 3rd International Conference on Artificial Intelligence and Industrial Engineering; 2017; 6 pgs.

*Primary Examiner* — Ojiako K Nwugo
(74) *Attorney, Agent, or Firm* — Benjamin Ford; Parker Justiss, P.C.

(57) ABSTRACT

This disclosure presents a process for communications in a borehole containing a fluid or drilling mud, where a conventional mud pulser can be utilized to transmit data to a transducer. The transducer, or a communicatively coupled computing system, can perform pre-processing steps to correct the received data using an average of a moving time window of the received data, and then normalize the corrected data. The corrected data can then be utilized as inputs into a machine learning mud pulse recognition network where the data can be classified and an ideal or clean pulse waveform can be overlaid the corrected data. The overlay and the corrected data can be fed into a conventional decoder or decoded by the disclosed process. The decoded data can then be communicated to another system and used as inputs, such as to a well site controller to enable adjustments to well site operation parameters.

20 Claims, 11 Drawing Sheets

(56) References Cited

U.S. PATENT DOCUMENTS

| | | | |
|---|---|---|---|
| 2009/0177404 A1* | 7/2009 | Hartmann | E21B 47/00 |
| | | | 702/9 |
| 2015/0361788 A1 | 12/2015 | Liu et al. | |
| 2016/0115778 A1 | 4/2016 | van Oort et al. | |
| 2016/0130937 A1 | 5/2016 | Logan et al. | |
| 2020/0225177 A1 | 7/2020 | Sungkorn et al. | |
| 2020/0248545 A1* | 8/2020 | Maus | E21B 47/09 |
| 2020/0333501 A1 | 10/2020 | Miller et al. | |
| 2021/0148217 A1 | 5/2021 | Walker | |

* cited by examiner

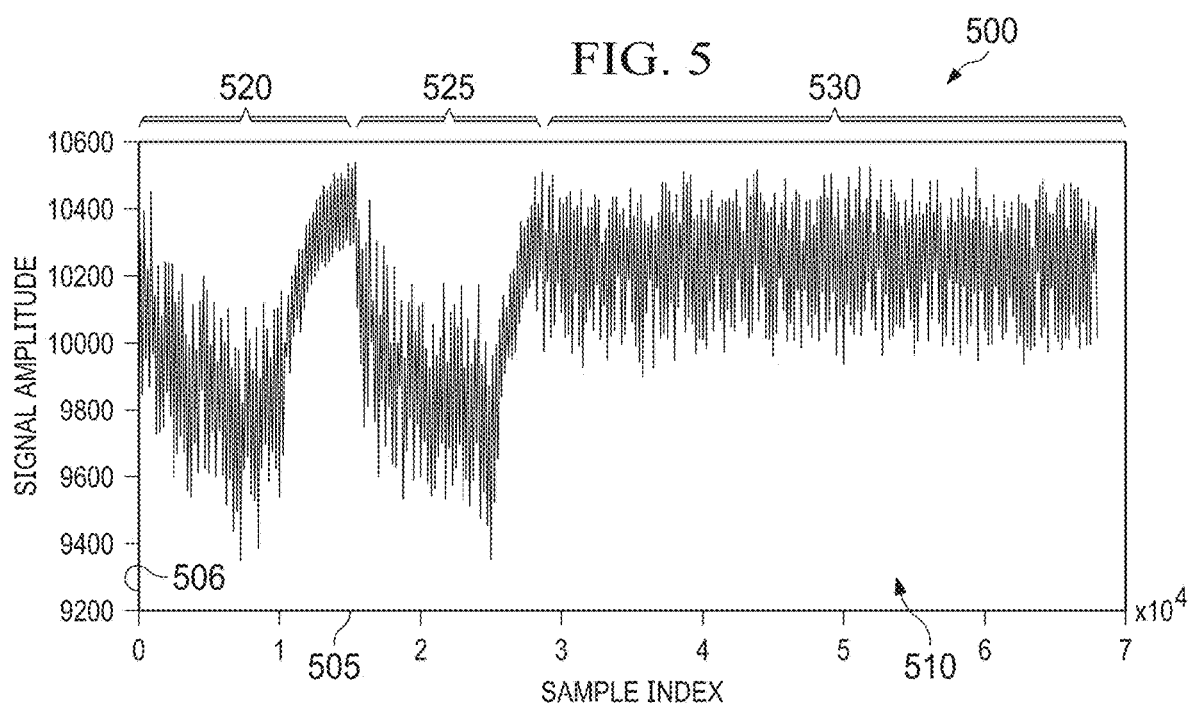
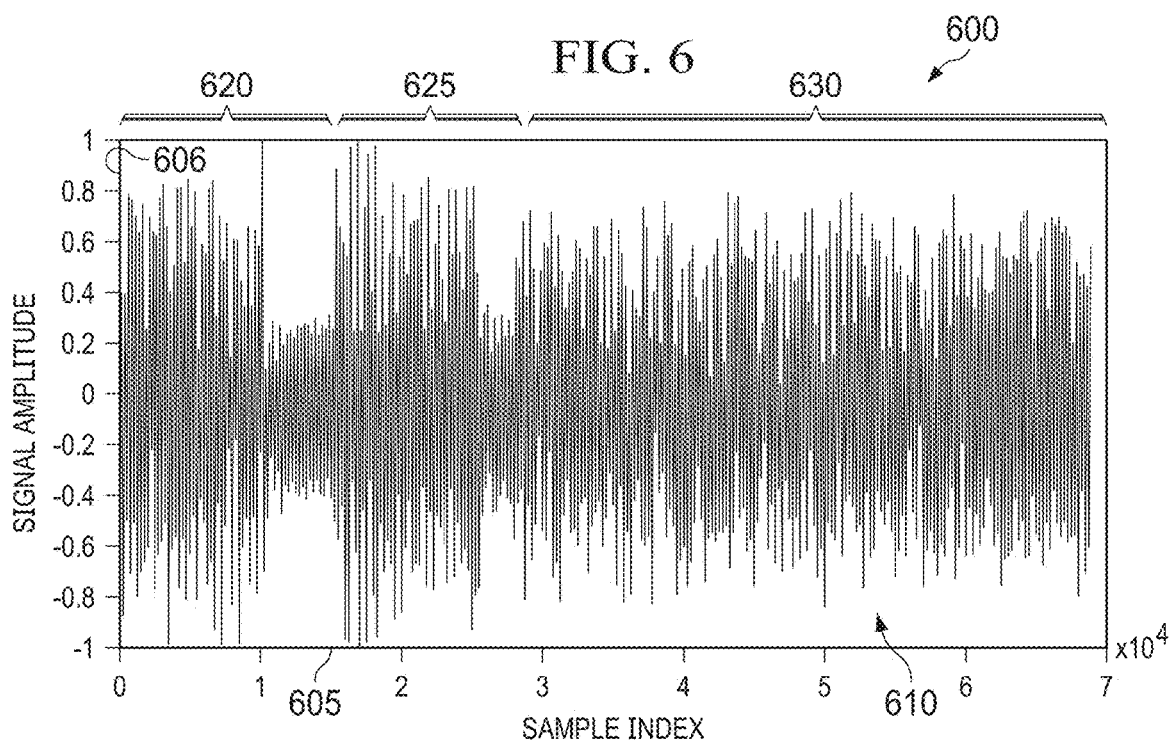

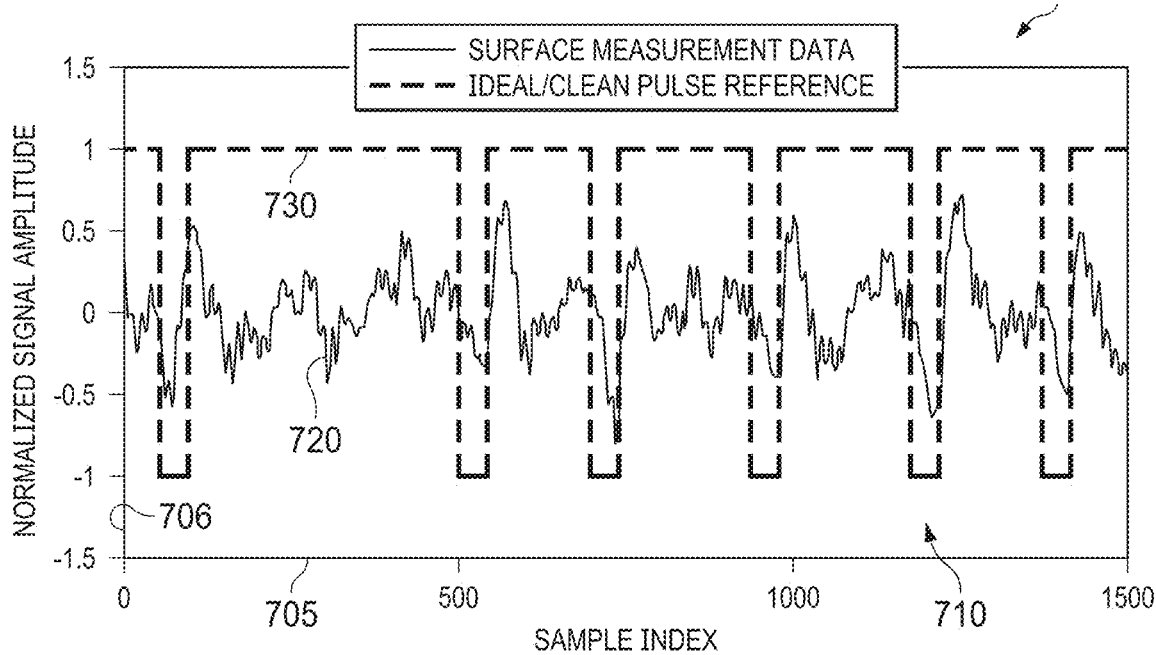
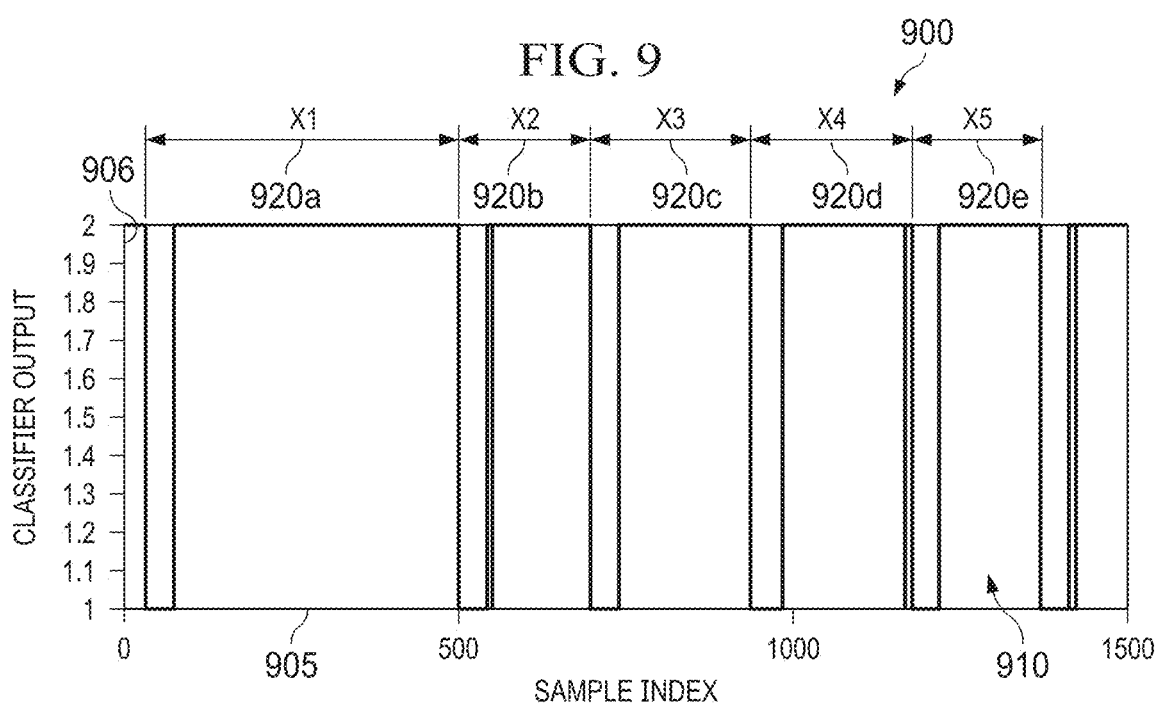

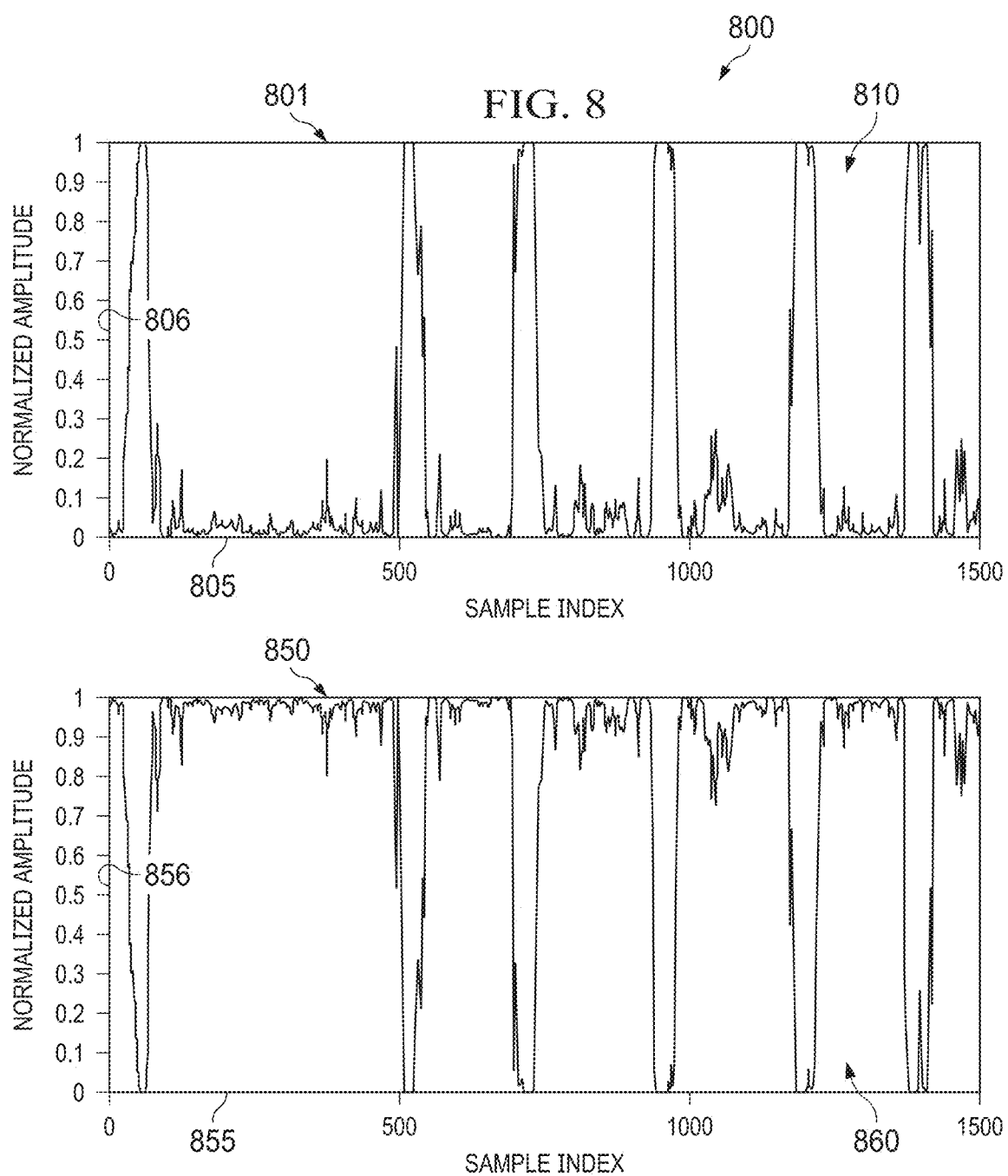

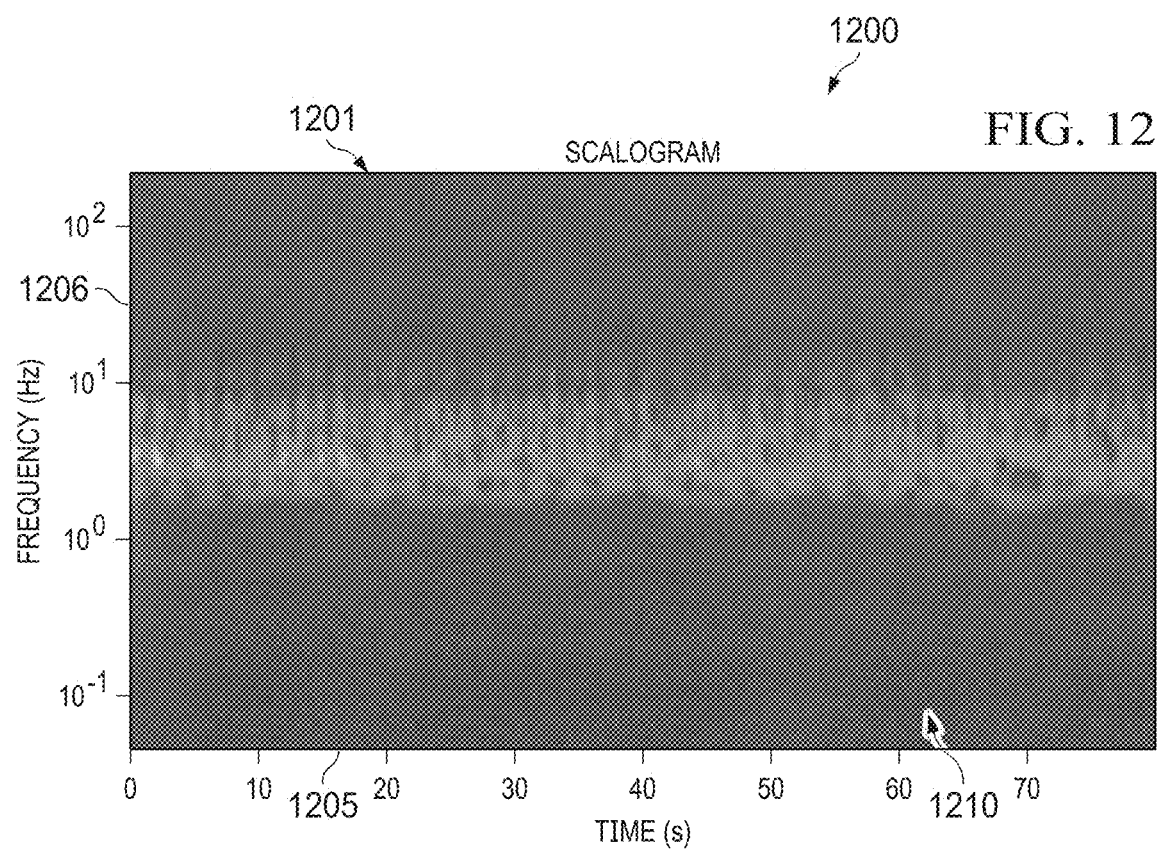
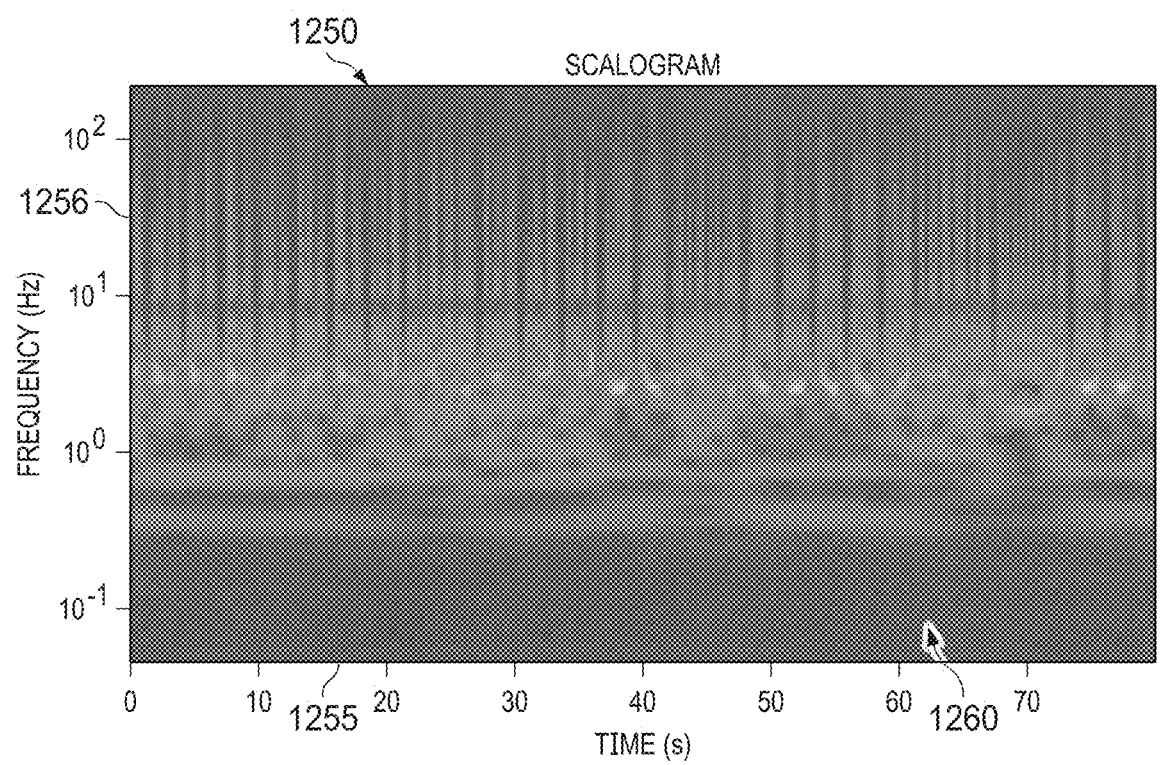
FIG. 12

MACHINE LEARNING MUD PULSE RECOGNITION NETWORKS

CROSS-REFERENCE TO RELATED APPLICATION

This application is a continuation of U.S. Non-Provisional application Ser. No. 17/131,204 filed by Dingding Chen, et al. on Dec. 22, 2020, entitled "MACHINE LEARNING MUD PULSE RECOGNITION NETWORKS", commonly assigned with this application and incorporated herein by reference in its entirety.

TECHNICAL FIELD

This application is directed, in general, to a mud pulse recognition network and, more specifically, to using machine learning with the mud pulse recognition network.

BACKGROUND

In borehole operations, such as when performing drilling operations, a mud pulser can be utilized to send data from one location to another, such as from a downhole location to a surface or near surface location. As the length of the borehole increases, the distance between the mud pulser and receiving transducer also increases. The increased distance can cause the mud pulser transmission to incur a less favorable signal to noise ratio and errors can increase in the data being transmitted. A process that can take the received mud pulse data and improve the signal to noise ratio while decreasing errors would be beneficial.

SUMMARY

In one aspect, a method is disclosed. In one example, the method includes (1) obtaining a mud pulse data transmission from a mud pulser located in a borehole, (2) processing the mud pulse data transmission to generate normalized corrected data, and (3) generating SNR corrected data from the mud pulse data transmission utilizing a machine learning mud pulse recognition network (MPRN) and the normalized corrected data as an input to the machine learning MPRN.

In another aspect, a computer program product having a series of operating instructions stored on a non-transitory computer-readable medium that directs a data processing apparatus when executed thereby to perform operations to decode mud pulse data transmissions is disclosed. In one example, the computer program product has operations including (1) obtaining a mud pulse data transmission from a mud pulser located in a borehole, (2) processing the mud pulse data transmission to generate normalized corrected data, and (3) generating SNR corrected data from the mud pulse data transmission utilizing a machine learning mud pulse recognition network (MPRN) and the normalized corrected data as an input to the machine learning MPRN.

BRIEF DESCRIPTION

Reference is now made to the following descriptions taken in conjunction with the accompanying drawings, in which:

FIG. 5 is an illustration of a diagram of an example waveform demonstrating received mud pulses;

FIG. 6 is an illustration of a diagram of an example waveform demonstrating a normalized waveform;

FIG. 7 is an illustration of a diagram of an example fit-for-purpose waveform;

FIG. 8 is an illustration of a diagram of an example classified output;

FIG. 9 is an illustration of a diagram of an example graph of a clean positive square wave;

FIG. 12 is an illustration of a diagram of an example scalogram; and

DETAILED DESCRIPTION

Figure 1:
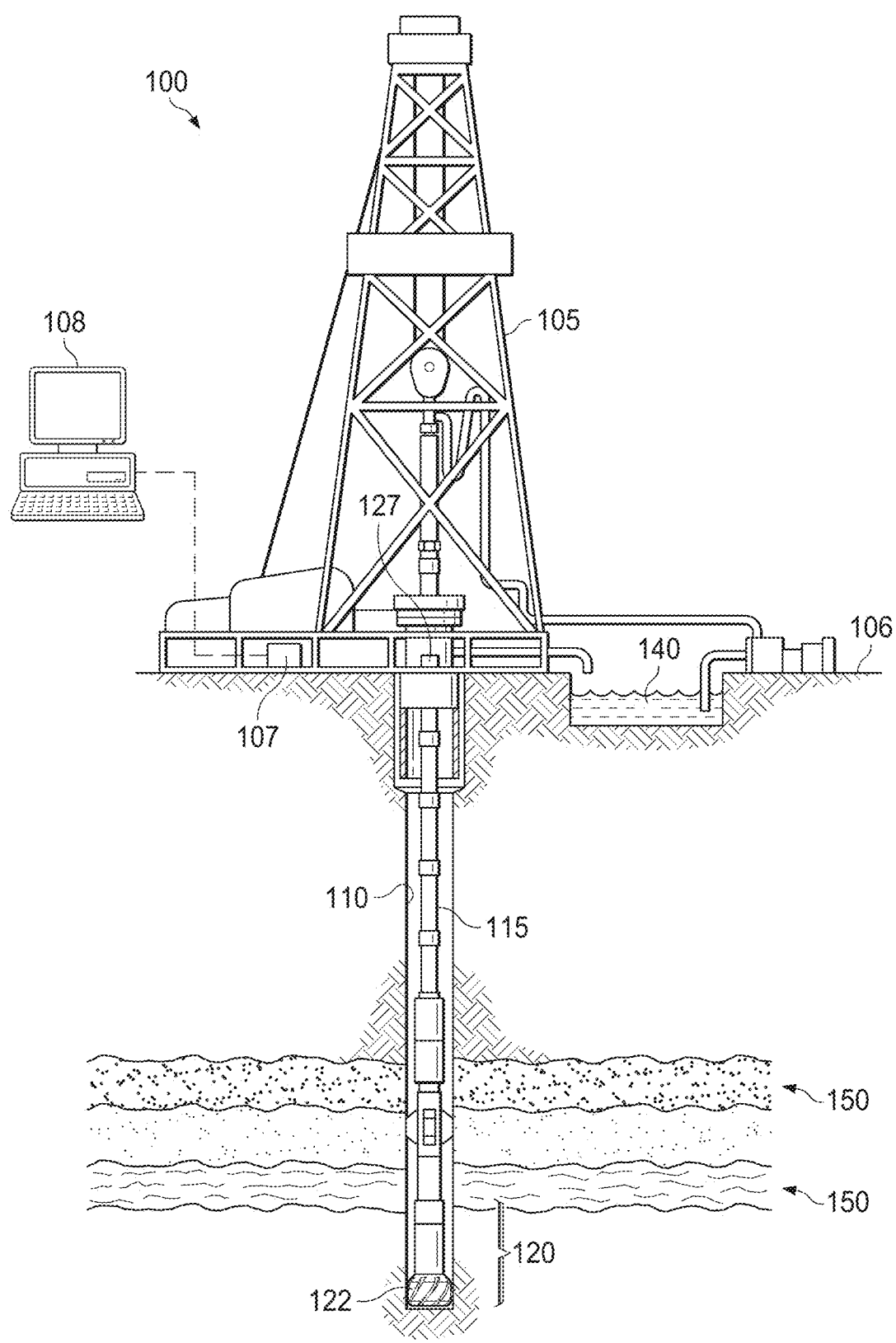
FIG. 1 is an illustration of a diagram of an example well system with a machine learning mud pulse recognition network (MPRN)

Mud pulse telemetry has been used in well development, such as in the hydrocarbon production industry, scientific areas, or other industries, to transmit downhole data to an uphole location or a surface location, and vice versa, e.g., from a surface or uphole location to a downhole location. A common mode of data transmission can be a pulse position modulation (PPM) process. PPM can operate by opening and closing a valve with a specified sequence in a circulating flow line. Pressure pulses can be generated to encode data, for example, using variable intervals between the pulses.

Pressure transducers can be utilized to detect the pressure pulses. Depending on environmental factors, e.g., parameters, in the borehole and the tools being used in the borehole, the pressure transducer signals can be contaminated, e.g., experience interference or noise, by inter-symbol interference (ISI), reflections along the drill string, or pump and drilling bit noise. Such noise can lead to potential errors in the pulse detection and hence introduce errors in the decoded data from the detected pulses.

The rate and magnitude of the errors can increase as the distance between the mud pulser and the transducer increase, such as when drilling operations increase the borehole depth. The rate and magnitude of the errors can be expressed using a signal-to-noise ratio (SNR), where the SNR can be reduced due to higher attenuation in longer drill strings. As the distance between the mud pulser and the transducer increases, the rate of the data transmission can be reduced as well, due to the ISI.

This disclosure presents a machine learning process that utilizes mud pulse recognition networks (MPRN). The machine learning process can utilize one or more various conventional neural networks or deep learning neural networks, such as feedforward or convolutional networks. The machine learning process can utilize one or more various conventional transfer functions and training algorithms. The process can enhance mud pulse SNR at the transducer, can adapt to various drilling environments and changes in the environments, can support multiple transducer data integration/combination, and can improve real-time data rate in deep, extended drilling applications. The process can be used in conjunction with various decoders, for example, data processors or data processing software, such, Halliburton Company's MaxReceiver. In some aspects, the disclosed processes can be utilized as a MPRN decoder for mud pulse telemetry in place of other decoders. Decoders can be implemented as software, hardware, or a combination thereof.

In the disclosed processes, the neural networks in MPRN can be trained with pressure transducer data measured during transmission of predetermined preamble patterns with known pulse intervals at the beginning of each job. By using existing mud pulse preambles, no changes are needed to existing mud pulsers or mud pulser controllers. Training of the neural network can take place when triggered by an event, such as a notification from a well site controller, a change in a well site controller operation, a change in drilling conditions, a change in an environment parameter of the borehole, a change of a mud flow rate, or a user input.

The training data outputs can generate a data transmission overlay mapping, e.g., data sequences, for example, pulse signals as [1 0] and non-pulse signals as [0 1]. In some aspects, the pulse signals, for example, the [1 0] overlay, can produce output of positive pulse data sequences with pulse signals close to the value of one and non-pulse signals close to the value of zero. In some aspects, the non-pulse signals, for example, the [0 1] overlay, can produce output of negative pulse data sequences with pulse signals close to the values of zero and non-pulse signals close to the value of one. In some aspects, one or more of the data transmission overlay mappings can be utilized to enhance mud pulse SNR and perform as a data pre-processor to support the decoder. In some aspects, one or more of the data transmission overlay mappings can be utilized to directly decode the mud pulse transmissions.

To reduce sensitivity to changing mud flow environments, for example, during pump start up, pressure transducer data can be averaged over a moving time window. The averaged data can then be normalized and used as an input into a machine learning MPRN for training. In some aspects, the adaptive training can be optimized with a fit-for-purpose preamble.

In some aspects, training can utilize big data machine learning, such as with a ethernet communication memory board (ECMB) logs, Simulink approximations, or validated outputs from previous decoder executions to generate a general-purpose model. For example, ECMB can be deployed downhole to record the data that is being pulsed by the mud pulser. At the end of a drilling job or operation segment, this data can be retrieved and used to evaluate the telemetry decoder. The big data machine learning can be used to train the machine learning MPRN at the end of the job with the transmission received during the job. The big data machine learning can then be used to characterize the neural network with a correlation to the geological information of the well, e.g., environment parameters of the borehole. A big database of different neural network models for different well environments can be built and utilized for future mud pulse operations.

This disclosure presents advantages to existing mud pulse telemetry. For example, using the ideal 0 and 1 square pulses as a target for machine learning can enhance the signal contrast between pulse and non-pulse data. This process can allow the MPRN target values assignment independent of the pulse shape produced by a mud pulser, and can enhance the SNR utilizing transducer measurement data regardless of mud channel complexity between the mud pulser and transducer. With an improved SNR, the MPRN can detect mud pulses at higher data rates than under conditions of the original SNR.

The machine learning MPRN can utilize received preamble data with known time intervals between pulses for faster training. A trained MPRN, trained using data learned from a first scenario can be applied directly, or through minor adaptive modification, to a second scenario that has similar drilling environment factors. The preamble design can utilize general-purpose pattern selection, fit-for-job pattern selection, or a combination thereof. The general-purpose data selection can include using patterns with various pulse widths (PWs) and intervals. The fit-for-job data selection can include using examples with fixed pulse parameters that satisfy a set of environment factors leading to more robust time interval detection.

The machine learning MPRN can simplify the data processing procedures and can increase the speed for detecting mud pulse time intervals. In some aspects, applying machine learning MPRN to a non-linear filter can eliminate the use of additional noise cancellation algorithms, such as the bucket brigade filter based on pump stroke signals used in legacy decoders. In some aspects, this can eliminate the need for pump strokes signals.

In some aspects, machine learning MPRN can be utilized to enable direct pulse detection and time intervals decoding. In this aspect, the machine learning MPRN outputs can be evaluated with cross-entropy and confusion matrices. In some aspects, the machine learning MPRN outputs can be further processed utilizing mud pulse constraints and correlation thresholds to detect mud pulse time intervals. In this aspect, decoder and other interpretative algorithms can be bypassed.

In some aspects, the training of the machine learning MPRN can be automated, allowing the machine learning MPRN to operate with no or minimal user intervention at the well site. In this aspect, costs can be lowered by reducing the number of well site operators or engineers present at the well site and allowing decisions to be made earlier in time due to the improved communications between the mud pulser and transducer.

Turning now to the figures, FIG. 1 is an illustration of a diagram of an example well system 100 with a machine learning MPRN that can be utilized to transmit data uphole or downhole, for example, wireline logging system, a drilling system, a logging while drilling (LWD) system, a measuring while drilling (MWD) system, a seismic while drilling (SWD) system, a telemetry while drilling (TWD) system, a wireline system, injection well system, extraction well system, and other hydrocarbon well systems. Well system 100 includes a derrick 105, a well site controller 107, and a computing system 108. Well site controller 107 includes a processor and a memory and is configured to direct operation of well system 100. Derrick 105 is located at a surface 106.

Extending below derrick 105 is a borehole 110 with downhole tools 120 at the end of a drill string 115. Downhole tools 120 can include various downhole tools, such as a formation tester or a bottom hole assembly (BHA). At the bottom of downhole tools 120 is a drilling bit 122. Other components of downhole tools 120 can be present, such as a fluid pipe coupled to an uphole fluid container or conduit, such as surface container or conduit 140, a local power supply (e.g., generators, batteries, or capacitors), telemetry systems, sensors, transceivers, and control systems. Downhole tools 120 includes a mud pulser along with a mud pulser controller. In some aspects, downhole tools includes a transducer capable of receiving mud pulses. A transducer 127 is located at surface 106 and is communicatively coupled to well site controller 107 or computing system 108. Borehole 110 is surrounded by subterranean formation 150.

Well site controller 107 or computing system 108 which can be communicatively coupled to well site controller 107, can be utilized to communicate with downhole tools 120 and transducer 127, such as sending and receiving telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107.

Well site controller 107 or computing system 108 can communicate with downhole tools 120 using conventional means, now known or later developed, to direct operations of downhole tools 120. In some aspects, communications uphole can utilize mud pulse telemetry. In some aspects, downhole communications can utilize mud pulse telemetry. For example, in some aspects, a mud pulser located with downhole tools 120 can transmit data uphole to transducer 127. Transducer 127 can communicate the received pulses to well site controller 107 or computing system 108 for further processing and analysis. In some aspects, transducer 127 can pre-process the received data. In some aspects, transducer 127 can pre-process and decode the received data.

Figure 2:
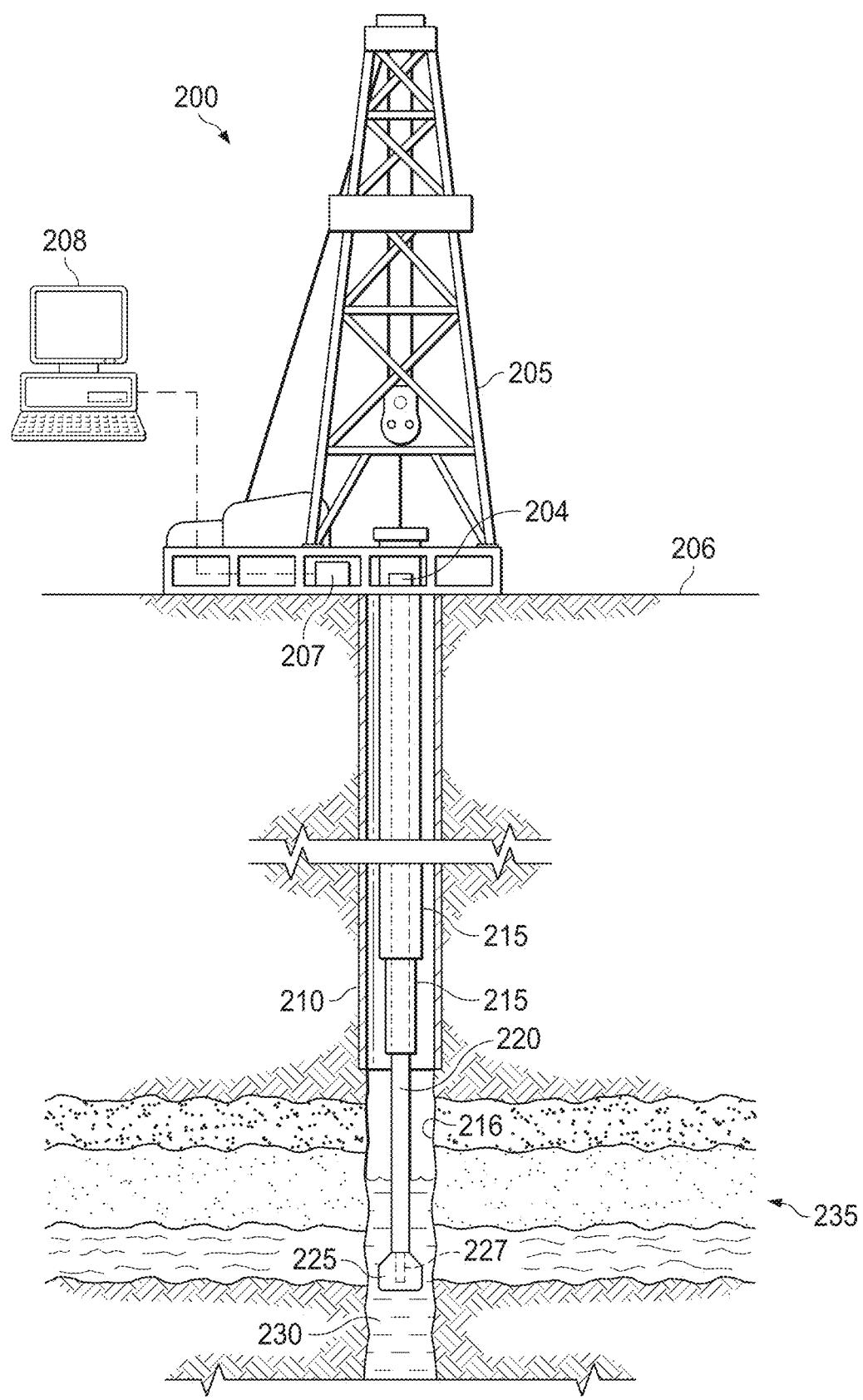
FIG. 2 is an illustration of a diagram of an example wireline well system with a machine learning MPRN.

FIG. 2 is an illustration of a diagram of an example wireline well system 200 with a machine learning MPRN. Wireline well system 200 can be, for example, an extraction system, an injection system, a production system, a wireline system, other hydrocarbon well systems, or a combination of well systems. Wireline well system 200 depicts a wireline well system and includes a derrick 205, a well site controller 207, and a computing system 208. A set of transducers 204 are located at surface 206. In some aspects, set of transducers 204 can be located below surface 206, such as along an upper section of drill pipe. Well site controller 207 includes a processor and a memory and is operable to direct operation of wireline well system 200. Derrick 205 is located at a surface 206.

Extending below derrick 205 is a borehole 210, with two cased sections 215 and one uncased section 216. Wireline 220 is inserted in borehole 210 to hold a downhole tool 225. Borehole 210 is surrounded by a subterranean formation 235 which includes a hydrocarbon reservoir. A fluid 230 can be pumped into or out of the subterranean formation.

Downhole tool 225 can include various downhole tools, mud pulsers, transducers, formation testers, and BHA, such as one or more mud pulsers 227. Other components of downhole tool 225 can be present, such as a local energy supply, or batteries and capacitors to store energy received from another system, as well as a transceiver and a control system.

Mud pulsers 227 can transmit data uphole to set of transducers 204. Set of transducers 204, well site controller 207, or computing system 208 can utilize a machine learning MPRN to pre-process and decode the received data to be used by other systems as inputs.

Computing system 208 or well site controller 207 can be utilized to perform the operations of the machine learning MPRN in part or in whole, for example, set of transducers 204 can perform pre-processing while well site controller 207 performs the decoding process. Computing system 208 can be proximate well site controller 207 or be a distance away, such as in a cloud environment, a data center, a lab, or a corporate office. Computing system 208 can be a laptop, smartphone, PDA, server, desktop computer, cloud computing system, and other computing systems that are operable to perform the process and methods described herein. The information and results generated from computing system 208 can be communicated by various conventional means to well site controller 207 and to well site operators and engineers so the received data can be used in modifying a well operation plan of wireline well system 200.

Figure 3:
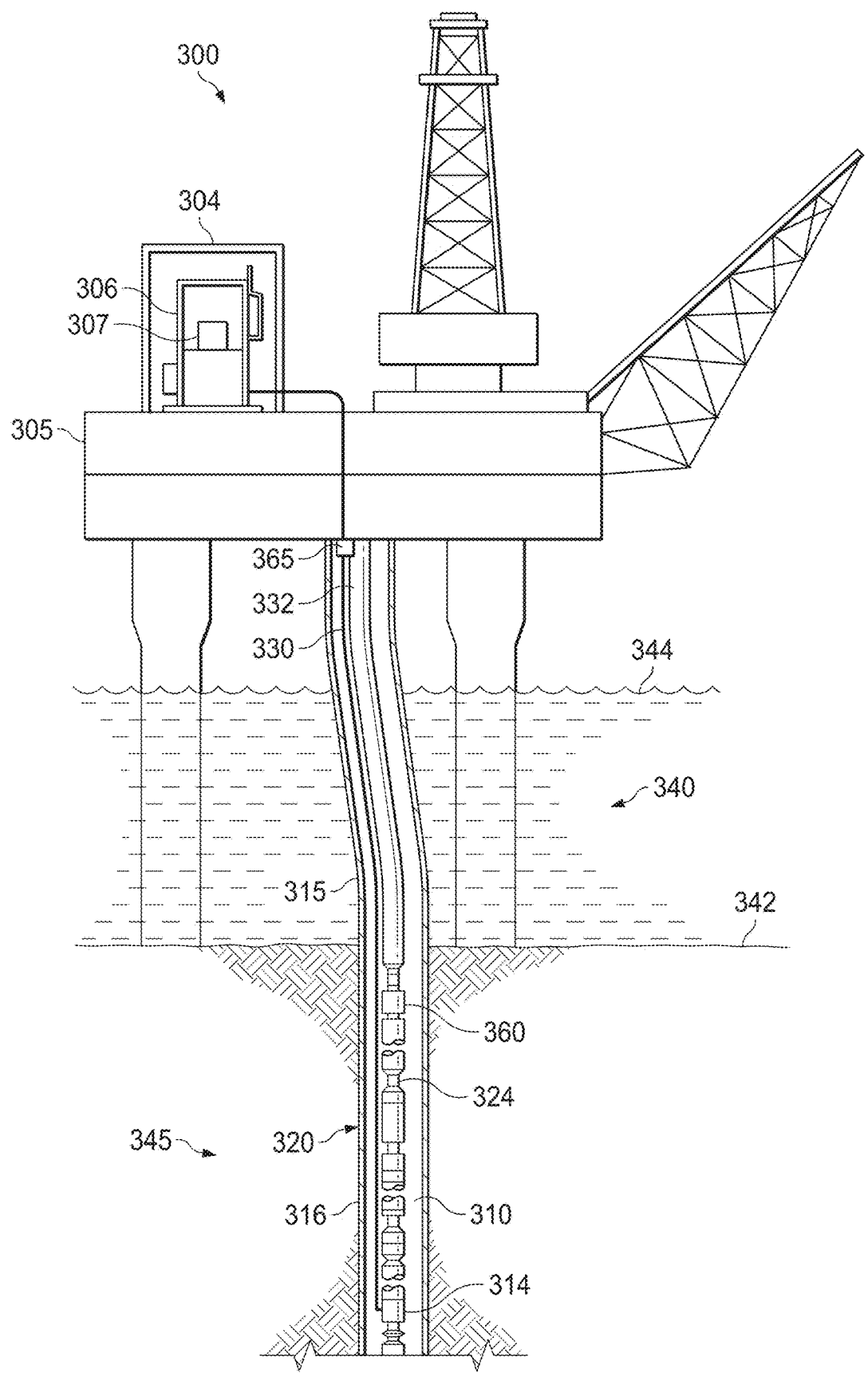
FIG. 3 is an illustration of a diagram of an example offshore well system with an electric submersible pump assembly.

FIG. 3 is an illustration of a diagram of an example offshore well system 300 with an electric submersible pump (ESP) assembly 320. ESP assembly 320 is placed downhole in a borehole 310 below a body of water 340, such as an ocean or sea. Borehole 310, protected by casing, screens, or other structures, is surrounded by subterranean formation 345. ESP assembly 320 can be used for onshore operations. ESP assembly 320 includes a well controller 307 (for example, to act as a speed and communications controller of ESP assembly 320), an ESP motor 314, and an ESP pump 324.

Well controller 307 is placed in a cabinet 306 inside a control room 304 on an offshore platform 305, such as an oil rig, above water surface 344. Well controller 307 is configured to adjust the operations of ESP motor 314 to improve well productivity. In the illustrated aspect, ESP motor 314 is a two-pole, three-phase squirrel cage induction motor that operates to turn ESP pump 324. ESP motor 314 is located near the bottom of ESP assembly 320, just above downhole sensors within borehole 310. A power/communication cable 330 extends from well controller 307 to ESP motor 314. A fluid pipe 332 fluidly couples equipment located on offshore platform 305 and ESP pump 324.

In some aspects, ESP pump 324 can be a horizontal surface pump, a progressive cavity pump, a subsurface compressor system, or an electric submersible progressive cavity pump. A motor seal section and intake section may extend between ESP motor 314 and ESP pump 324. A riser 315 separates ESP assembly 320 from water 340 until sub-surface 342 is encountered, and a casing 316 can separate borehole 310 from subterranean formation 345 at and below sub-surface 342. Perforations in casing 316 can allow the fluid of interest from subterranean formation 345 to enter borehole 310.

Offshore well system 300 is demonstrating an example where a mud pulser 360 is located downhole, along a portion of fluid pipe 332, as part of ESP assembly 320. As target fluid is pumped up to the surface, mud pulser 360 can transmit data to a transducer 365 located at offshore platform 305. In some aspects, transducer 365 can pre-process the received data. In some aspects, transducer 365 can decode the received data. In some aspects, transducer 365 can be a set of transducers. The received data, the pre-process data, the decode data, or a combination thereof, can be communicated to well controller 307.

FIGS. 1 and 2 depict onshore operations. Those skilled in the art will understand that the disclosure is equally well suited for use in offshore operations. FIGS. 1, 2, and 3 depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 4:
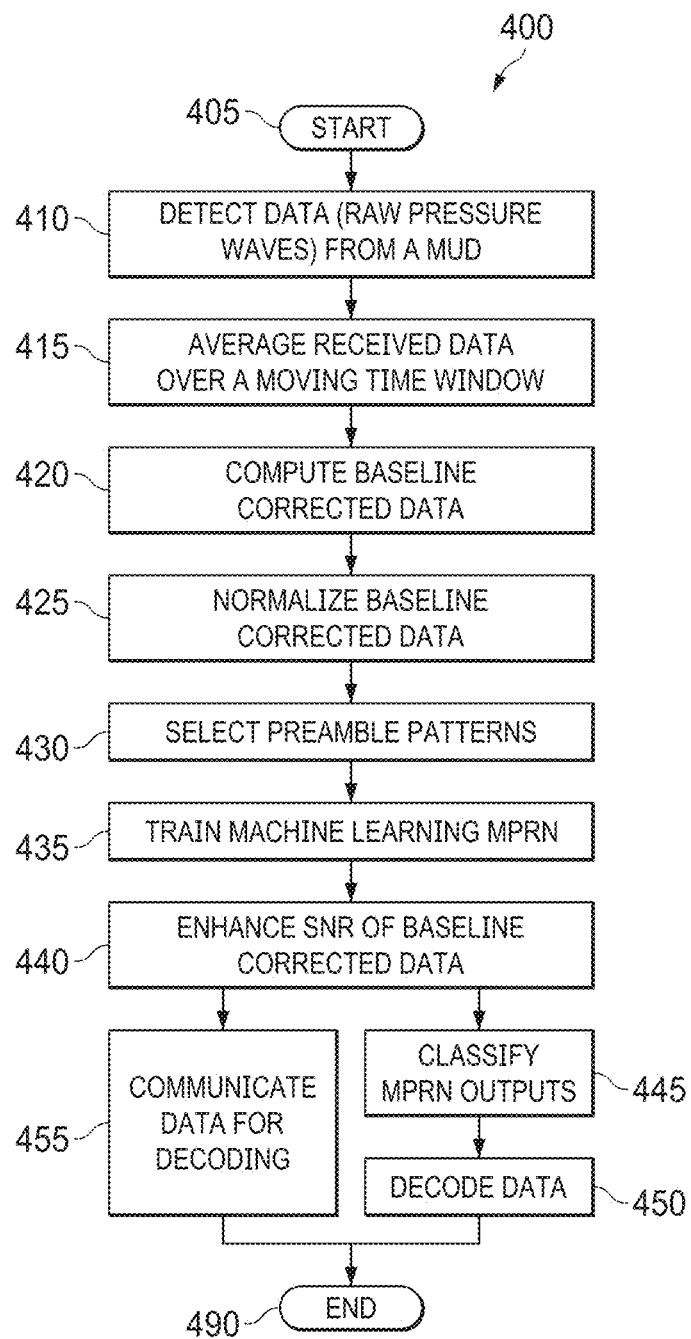
FIG. 4 is an illustration of a flow diagram of an example method for implementing machine learning techniques in conjunction with mud pulse technology.

FIG. 4 is an illustration of a flow diagram of an example method 400 for implementing machine learning techniques in conjunction with mud pulse technology. Method 400 can be used to improve the data rate and reduce errors in received communications using mud pulsers. Method 400 can be implemented on one or more computing systems or devices, such as a well site controller, a transducer with a controller system, or other systems. Method 400 can be implemented as software, such as a function, module, application, library, dynamic link library, or other software forms, or can be implemented in hardware, such as read-only memory, or other chip technologies.

Method 400 starts at a step 405 and proceeds to a step 410. In step 410, the mud pulse transmissions can be detected by a transducer and collected as raw data by the system. The raw data can be collected from the raw pressure waveforms from the transducer measurements, for example, see FIG. 5 for a demonstration of the raw waveform data.

In a step 415, a moving time window can be determined and an average or mean of the raw data can be calculated through the moving time window. The moving time window can be of a pre-defined length of time, for example, in a range of 3 to 250 milliseconds. A smaller or larger length of time than this stated range can be utilized depending on environmental factors. The moving time window length can be adjusted according to the pulse parameters selected or as determined by characteristics of the mud telemetry channel. For example, a longer drill string can indicate a longer moving time window.

In a step 420, a baseline for the raw data can be computed, thereby generating corrected data, by subtracting the calculated average in step 415 from the raw data. This can be computed for each moving time window for the set of data collected within that time window. The corrected data can be less sensitive to changes in the drilling environment, such as mud flow fluctuations.

In a step 425, the corrected data can be normalized to the values between −1.0 and +1.0 to improve the process for training the neural network. For example, see FIG. 6 for a demonstration of a normalized waveform. Step 410, step 415, step 420, and step 425 can be collectively referred to as pre-processing steps.

In a step 430, the received preamble patterns, which are part of the received transmission data and hence part of the normalized corrected data, can be selected and utilized as inputs for training the MPRN and building the MPRN models. In some aspects, the preamble design utilizes a general-purpose pattern selection. In some aspects, the preamble design utilizes a fit-for-purpose pattern selection. The general-purpose data selection can use patterns with various mud pulse widths and time intervals. The fit-for-purpose data selection can use fixed mud pulse parameters determined for a particular drilling operation, for example, see FIG. 7 demonstrating a fit-for-purpose preamble. In some aspects, the preamble can be stored in the mud pulser memory, and be predetermined or downloaded into memory prior to use. A downlink can direct the pulser to use a specific preamble. In some aspects, the preambles can be downloaded in real-time or near real-time as determined by changes in the drilling environment, such as when there are changes in the flow rate.

In a step 435, the machine learning MPRN can be trained using the selected preambles of step 430. Various types of transfer functions and neural network structures can be utilized. For example, a two-layer feedforward network structure can be utilized. The normalized corrected data can be organized in moving time window inputs of various lengths, depending on the downhole environment parameters, for example using a time window length of 90 milliseconds. In this example, the hidden layer can be filled with 50 processing nodes using a hyperbolic tangent sigmoid function (a=tansig(n)=2/(1+exp(−2*n))−1) as the transfer function. In some aspects, the training output can be defined such as to generate a data transmission overlay mapping, which can be represented as [1 0] for pulse signals, and [0 1] for other signals, for example, by using a softmax transfer function (a=softmax(n)=exp(n)/sum(exp(n))) in the hidden layer. In some aspects, the data transmission overlay mapping can use other types of representations. In some aspects, the calibration can be performed with a scaled conjugate gradient (trainscg) algorithm for on-line adaptive training. In other aspects, other types of calibration algorithms can be utilized.

In a step 440, the normalized corrected data can be processed using the trained machine learning MPRN. In some aspects, the machine learning MPRN can output a positive pulse data sequence with time, for example, see FIG. 8 graph 801 for a demonstration of a visual output. In some aspects, the machine learning MPRN can output a negative pulse data sequence, for example, see FIG. 8 graph 850 for a demonstration of a visual output. Compared to the normalized corrected data in FIG. 7, the data sequences in FIG. 8 have an enhanced mud pulse SNR. The normalized corrected data can have the output of the machine learning MPRN applied to generate a SNR corrected data. Depending on the mud pulser used, the positive or negative pulse output can be selected and then used as input into a decoder to improve the decoder's pulse interval detection. The positive pulse output can be utilized when the mud pulser used creates increased pressure over the ambient mud flow pressure to generate the transmission mud pulses. The negative pulse output can be utilized when the mud pulser used creates decreased pressure under the ambient mud flow pressure to generate the transmission mud pulses.

From step 440, method 400 can proceed to a step 445 or a step 455. Method 400 can proceed to step 445 if the machine learning MPRN output will be handled by the disclosed processes, and proceed to step 455 if the machine learning MPRN output will be handled by an external decoder. In step 445, the machine learning MPRN output can be classified and utilized to clean pulse or non-pulse signals in the normalized corrected data to generate a clean corrected data. Proceeding to a step 450, the outputs can be used for direct pulse interval detection, see FIG. 10 for additional details on this step.

In the step 455, the classified MPRN outputs can be communicated to a decoder for decoding and further analysis and processing. Proceeding from step 455 or step 450, method 400 ends at a step 490. Method 400 refers to other figures that are presented by charts and graphs. These figures are for demonstration purposes, and the methods and processes described herein can be implemented as data within a computing system without a visual component.

In some aspects, a determination can be made when a retraining process is beneficial for the machine learning MPRN. The detected intervals from step 450 and step 455 can be monitored. In step 455, MPRN classifier outputs can be used in conjunction with a decoder. In step 450, MPRN classifier outputs can be used for decision making directly without a separate decoder. The outputs in step 450 and step 455 should be consistent. Mismatches, of a sufficient degree, can indicate that retraining of the MPRN model should be initiated. The on-line retraining can use previous matched intervals as targets, and previous network parameters as re-initialized parameters can increase the efficiency of the training of the machine learning MPRN.

FIG. 5 is an illustration of a diagram of an example waveform 500 demonstrating received mud pulses. A transducer can be used to collect and measure the mud pulse waveforms. Waveform 500 presents an example demonstration of measured pressure waveforms in a field operation sampled at 500 hertz (Hz), such as the raw data collected in step 410 of FIG. 4.

Waveform 500 has an x-axis 505 which shows the sampling index, where each index represents two milliseconds. A y-axis 506 shows the signal amplitude. A plot area 510 shows a visual representation of the collected raw data. A first preamble 520 is shown as the first sequence of data. A second preamble 525 is shown as the second sequence of data. A transmission data 530 is shown as the third sequence of data.

First preamble 520 and second preamble 525 are the data sequences between approximately index 0 and $3 \times 10^4$ and are the pre-defined preamble data sequences with variable pulse widths (PWs) and variable time intervals between pulses. In this example, the mud pulser is a negative pulser, hence the drop in pressure reading. Transmission data 530, from index $3 \times 10^4$ onward, has a nearly constant baseline, and has a fixed PW and minimum pulse time (MPT) which stays the same during this moving time window.

FIG. 6 is an illustration of a diagram of an example waveform 600 demonstrating a normalized waveform of waveform 500 in FIG. 5. Waveform 600 has been normalized between the values of −1.0 and 1.0.

Waveform 600 has an x-axis 605 which shows the sampling index, where each index represents two milliseconds. A y-axis 606 which shows the normalized signal amplitude. A plot area 610 shows a visual representation of the normalized data. A first preamble 620 is shown as the first sequence of data. A second preamble 625 is shown as the second sequence of data. A transmission data 630 is shown as the third sequence of data.

FIG. 7 is an illustration of a diagram of an example fit-for-purpose waveform 700. Fit-for-purpose waveform 700 shows an example of using a fit-for-purpose preamble with fixed pulse width and variable time intervals between pulses. Fit-for-purpose waveform 700 has an x-axis 705 which shows the sampling index, where each index represents two milliseconds. A y-axis 706 which shows the normalized signal amplitude. A plot area 710 shows a visual representation of the normalized data.

A waveform data 720 shows a normalized waveform of data. Overlaid waveform data 720 is a clean pulse reference 730, i.e., a ideal or clean pulse template. Waveform data 720 can be used as training inputs for a machine learning MPRN. Clean pulse reference 730 demonstrates an ideal square waveform that can be used as training outputs. In some aspects, the data mapping from the inputs to the outputs of the machine learning MPRN are not one-to-one. In some aspects, windowed inputs, e.g., a time delay line, can be used to build pattern recognition models.

FIG. 8 is an illustration of a diagram of an example classified output 800. Classified output 800 shows two graphs, a graph 801 demonstrates an example positive pulse sequence and a graph 850 demonstrates an example negative pulse sequence. The larger element in graph 801 indicates a pulse signal, and the larger element in graph 850 indicates a non-pulse signal. Graph 801 and graph 850 have a respective x-axis 805 or x-axis 855 which show the sampling index, where each index represents two milliseconds. Graph 801 and graph 850 have a respective y-axis 806 or y-axis 856 which show the normalized signal amplitude. Graph 801 and graph 850 have a respective plot area 810 or plot area 860 which show a visual representation of the normalized data.

Graph 801 and graph 850 show that machine learning MPRN output vector sums to 1 for a given input. This feature can be used in further analysis, such as step 445 in FIG. 400, to return the indices (x-axis 805 or x-axis 855) indicating the position of the larger element in each column, e.g., a winner takes all algorithm, and the indices therefore act as classifier output to distinguish pulse and non-pulse signals.

FIG. 9 is an illustration of a diagram of an example graph 900 of a clean positive square wave. Graph 900 can be compared to the training and testing target waves directly to evaluate training and testing performance. Graph 900 has an x-axis 905 which shows the sampling index, where each index represents two milliseconds. A y-axis 906 which shows the classifier output. A plot area 910 which shows a visual representation of the classified data.

The classifier outputs can be input to a decoder or data software processor, such as described in step 455 of FIG. 4, using conventional software routines for decision making. The classifier outputs can also be used for direct pulse interval detection, such as described in step 450 of FIG. 4. In plot area 910, there are five time intervals shown, time interval 920a, time interval 920b, time interval 920c, time interval 920d, and time interval 920e (collectively, time intervals 920). Time interval 920a is 940 milliseconds, time interval 920b is 378 milliseconds, time interval 920c is 484 milliseconds, time interval 920d is 474 milliseconds, and time interval 920e is 384 milliseconds. Time intervals 920 can be rounded off to the correct nearest neighbor value, such as time interval 920a rounded to 930 milliseconds, time interval 920b rounded to 390 milliseconds, time interval 920c rounded to 480 milliseconds, time interval 920d rounded to 480 milliseconds and time interval 920e rounded to 390 milliseconds. For time intervals 920, mathematic constraints utilizing the actual pulsing configuration can be applied, for example, MPT=360, PW=90 and bit width (BW)=30).

Figure 10:
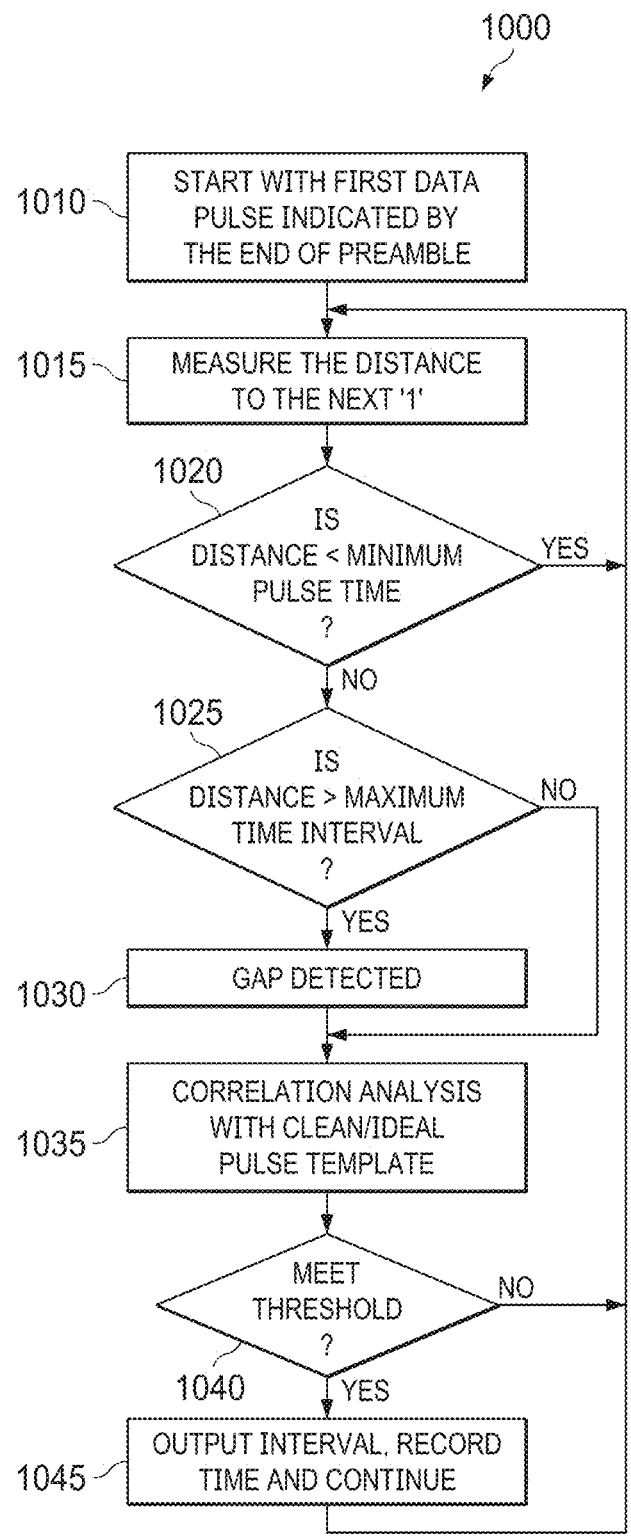
FIG. 10 is an illustration of a flow diagram of an example method demonstrating a direct pulse interval detection.

FIG. 10 is an illustration of a flow diagram of an example method 1000 demonstrating a direct pulse interval detection, such as can be utilized as part of step 450 of FIG. 4. The normalized and corrected data can be analyzed to determine a pulse interval. Method 1000 takes the outputs from step 445 of FIG. 4 and starts analysis at a step 1010. In a step 1010, the first data pulse after the preamble is used as an initial analysis point. In a step 1015, a pulse distance is measured to a subsequent maximum pulse, for example, a '1' in a positive mud pulse aspect. If there is no additional data to measure, method 1000 ends.

In a decision step 1020, the measured distance can be compared to a minimum pulse distance parameter, such as a parameter provided as an input to the system or defined as a default for the current downhole environmental conditions. If decision step 1020 determines that the measured distance is less than the minimum pulse time parameter, then method 1000 proceeds to step 1015 to measure distance to the next pulse. If decision step 1020 determines that the measured distance is equal to or greater than the minimum pulse time parameter, then method 1000 proceeds to a decision step 1025.

In decision step 1025, the measured distance is compared to a maximum time interval parameter, such as a parameter provided as an input to the system or defined as a default for the current downhole environmental conditions. If decision step 1025 determines that the measured distance is less than or equal to the maximum time interval parameter, then method 1000 proceeds to a step 1035. If decision step 1025 determines that the measured distance is greater than the maximum time interval parameter, then method 1000 proceeds to a step 1030.

In a step 1030, a gap in the received pulses can be detected, such as when the interval is greater than a maximum allowed interval. In some aspects, this could be an indication of a missed detection. In some aspects, this is due to when the next data to be pulsed is not ready. When a gap is detected, this information is stored and can be used later to evaluate the mud pulse telemetry performance. Method 1000 proceeds to step 1035. In step 1035, a correlation can be made between the measured distance and a clean or ideal pulse template. The correlation can be constructed from the detected time intervals that are rounded to the nearest neighbor value. It can be self-generated based on the parameters, such as MPT, BW, or PW, and can be used to correlate with the classifier output.

In a decision step 1040, the correlation made in step 1035 can be used to determine if the measured distance satisfies, e.g., pulse correlation, the correlation threshold. The threshold is a predefined fixed-level value used at the output of the correlator. If decision step 1040 determines that the correlation threshold is satisfied, then method 1000 proceeds to a step 1045. If decision step 1040 determines that the correlation threshold is not satisfied, then method 1000 proceeds to step 1015 and the measured distance is now to the next maximum pulse point in the data sequence.

In step 1045, the measured distance can be output as the distance interval that can be utilized for further analysis. The time window, e.g., record time, that spans the measured distance can also be output. The measured distance and time window can be stored and used later to evaluate the mud pulse telemetry performance.

Figure 11:
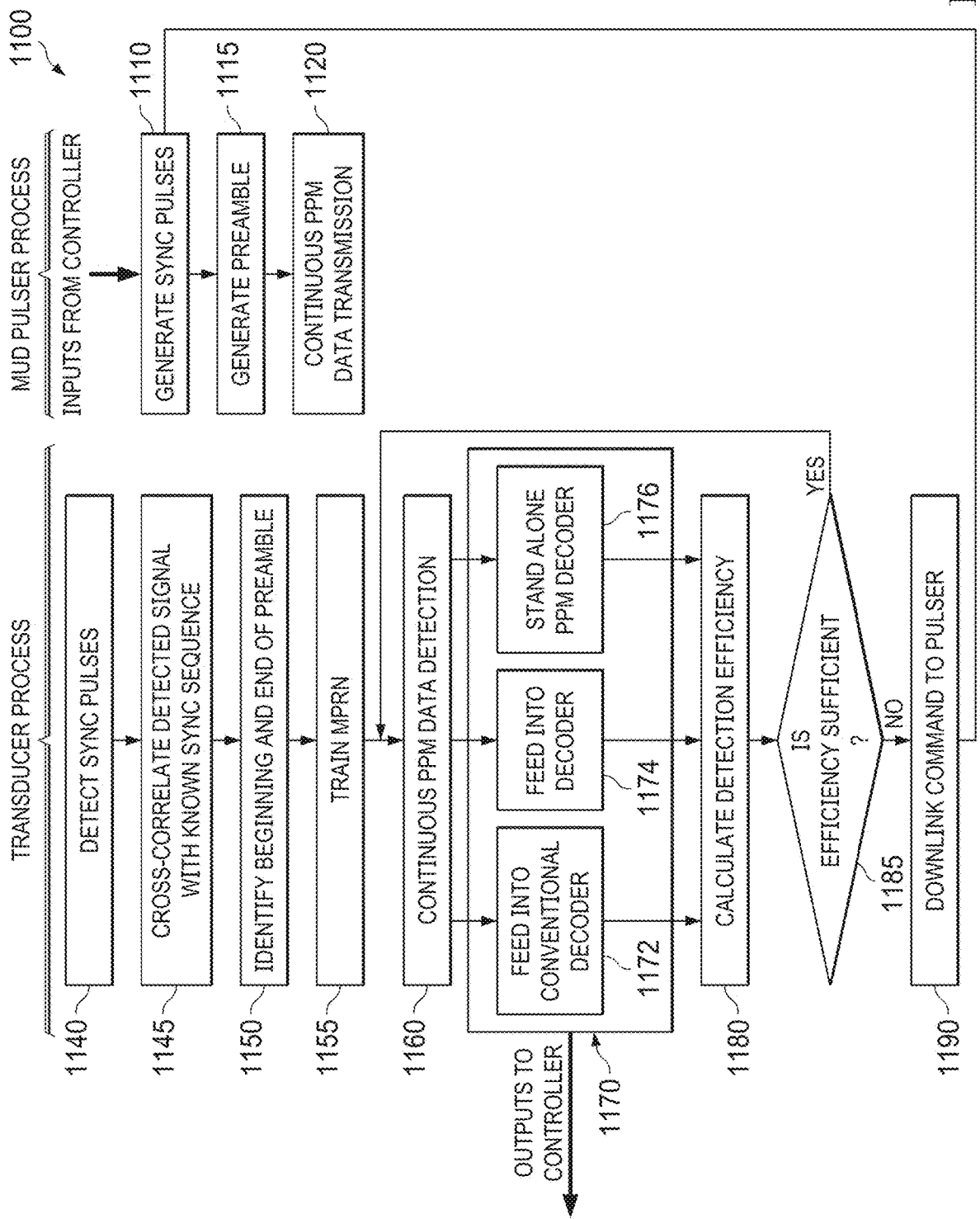
FIG. 11 is an illustration of a flow diagram of an example method demonstrating overall mud pulser processing.

FIG. 11 is an illustration of a flow diagram of an example method 1100 demonstrating overall mud pulser processing. In some aspects, method 1100 can be implemented using a mud pulser located downhole in a borehole and a transducer located uphole, such as near or at the surface. In some aspects, method 1100 can be implemented using a mud pulser located uphole, such as near or at the surface, and a transducer located downhole, such as with downhole tools. In some aspects, method 1100 can utilize a mud pulser controller. In some aspects, the mud pulser controller can be a separate controller directing operations of the mud pulser. In some aspects the mud pulser controller can be a well site controller or a computing system. In some aspects, the mud pulser controller can be located with the downhole tools. In some aspects, a transducer controller can be utilized with the transducer, for example, to perform the machine learning MPRN aspects of this disclosure. In some aspects, the transducer controller can be a separate computing system, a well site controller, a computing system, or another well site system.

Method 1100 can start with inputs from a mud pulser controller indicating that a transmission of data should be sent. Method 1100 proceeds to a step 1110 where the mud pulser can generate the synchronous pulses. In a step 1115 the preamble can be added to the transmission. The preamble can be pre-determined, such as using a set of default preambles, or the preambles can be modified at processing time using the environmental parameters downhole. In a step 1120, the pulse position modulation (PPM) can be utilized for the data to be encoded in the transmission.

The mud pulses can travel uphole or downhole to a transducer that is capable of receiving the mud pulses. Method 1100 proceeds to a step 1140 at the transducer. In step 1140, the transducer can detect the mud pulses. Method 1100 proceeds to a step 1145 that can be at the transducer, a controller, or another system. Step 1145 can cross-correlate the detected synchronous pulses with one or more known synchronous sequences. In a step 1150, the beginning and end positions of the preamble, or multiple preambles, can be determined. In a step 1155, the one or more preambles can be utilized as inputs into a machine learning MPRN as training inputs. In a step 1160, the continuous PPM data transmission can be pre-processed and used as inputs to the machine learning MPRN model to generate MPRN outputs.

The continuous PPM data transmission, e.g., the encoded data, and the MPRN outputs can be used as inputs into one or more systems or processes represented by box 1170. In some aspects, in a step 1172, the inputs can be fed into a conventional decoder. In some aspects, in a step 1174, the inputs can be fed into a decoder of this disclosed process, such as a decoder located as part of the transducer system. In some aspects, in a step 1176, the inputs can be fed into a stand alone PPM decoder. The one or more outputs from step 1172, step 174, or step 1176 can be communicated to a controller, a process, or a system for further processing, for example, to adjust well site operation parameters.

Method 1100, from box 1170, proceeds to a step 1180. In step 1180, the outputs from two or more of step 1172, step 1174, or step 1176, can be utilized to calculate a detection efficiency parameter. In a decision step 1185, the detection efficiency parameter can be compared to an efficiency threshold. This decision step can be utilized to determine if additional training of the machine learning MPRN should be conducted and other calibration processes should be performed. If the efficiency threshold is satisfied, then method 1100 proceeds to step 1160 where a next set of PPM data can be decoded, if available. If the efficiency threshold is not satisfied, then method 1100 proceeds to a step 1190 where a downlink command can be sent to the mud pulser or mud pulser controller adjusting the mud pulser operations. Method 1100 ends when the mud pulser controller determines that no further data is to be sent.

FIG. 12 is an illustration of a diagram of an example scalogram 1200. Scalogram 1200 is a demonstration of the improvement that can be visualized using the disclosed processes. Scalogram 1200 shows two graphs, graph 1201 that demonstrates the coefficients of continuous wavelet transform of the received mud pulse data, and graph 1250 that demonstrates the coefficients of continuous wavelet transform of the clean pulse data. Graph 1201 and graph 1250 have a respective x-axis 1205 and a x-axis 1255 which shows the moving time window in seconds. Graph 1201 and graph 1250 have a respective y-axis 1206 and a y-axis 1256 which shows the frequency of the data in Hz. Graph 1201 and graph 1250 have a respective plot area 1210 and a plot area 1260.

Graph 1250 reflects the difference of training inputs and outputs in time and frequency domain as compared to the raw data shown in graph 1201. In some aspects, when more than one transducer is being used to receive the mud pulses, the transducer that has received mud pulses with the smallest difference from an ideal or clean mud pulse is likely the transducer having the highest SNR, and consequently, be selected as the primary transducer for processing the received data.

In some aspects, measurements from more than one transducer can be combined using different weighting coefficients. The weighting coefficients can be derived such that the best transducer signal as quantified with the smallest difference will have the highest weight.

Figure 13:
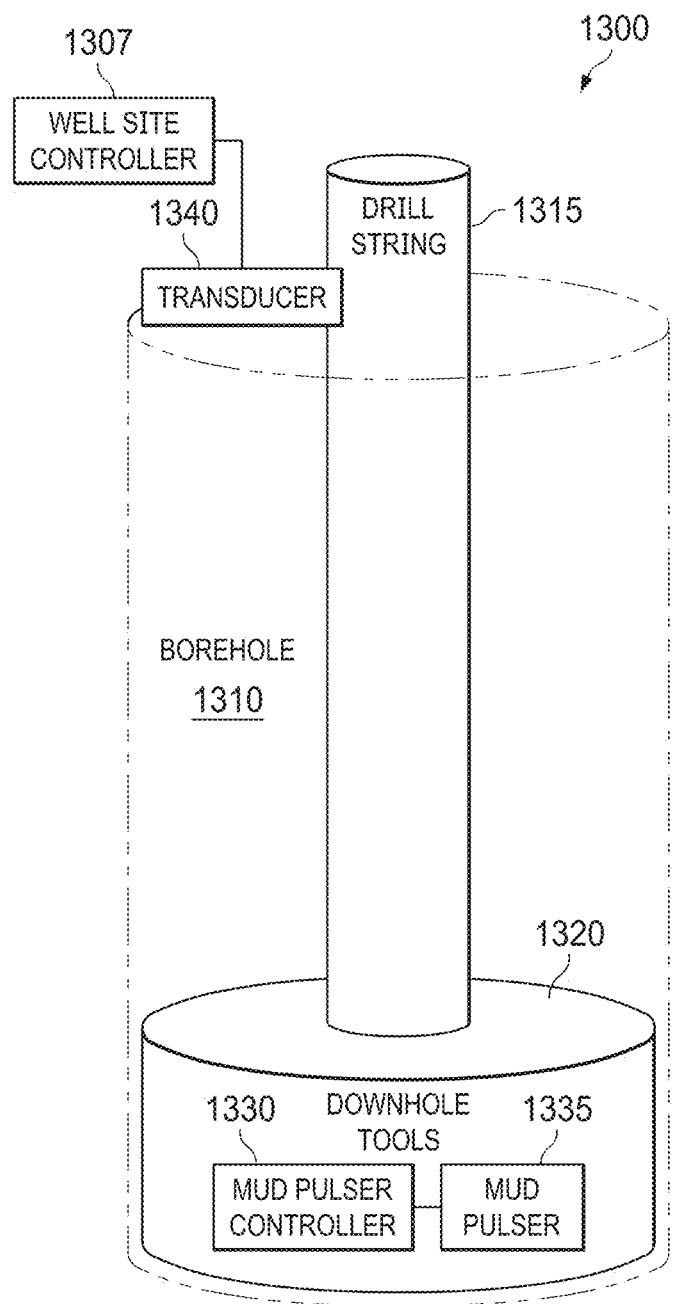
FIG. 13 is an illustration of a block diagram of an example mud pulse system.

FIG. 13 is an illustration of a block diagram of an example mud pulse system 1300. Mud pulse system 1300 is shown with a mud pulser downhole with other downhole tools and a transducer near a surface location. In other aspects, the transducer can be located downhole from the mud pulser. Mud pulser system 1300 has a borehole 1310, where a well site controller 1307 is located at a surface location. Inserted into borehole 1310 is a drill string 1315. Near the bottom of drill string 1315 are downhole tools 1320. A drill bit, geo-steering, and other tools can be located with or near downhole tools 1320. Downhole tools 1320 can include a mud pulser controller 1330 and a mud pulser 1335. Near a surface location is a transducer 1340.

Well site controller 1307 can direct operations of mud pulser controller 1330, mud pulser controller 1330 can be directed by another downhole tool of downhole tools 1320, or mud pulser controller 1330 can perform operations per its own control processing. Mud pulser controller can direct mud pulser to transmit data, such as data received from one or more other downhole tools 1320. Transducer 1340 can detect and receive the mud pulses, including synchronous pulses, preamble pulses, and data pulses. Transducer 1340 can perform pre-processing and machine learning MPRN processes on the received data, or transducer 1340 can transmit the received data to another system, such as a transducer controller or well site controller 1307, where the data can be pre-processed and processed through a machine learning MPRN. The corrected and cleaned data can be decoded and utilized as inputs for another process or system, such as to modify well site operation parameters.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple, or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. A method, comprising:
   obtaining a mud pulse data transmission from a mud pulser located in a borehole;
   processing the mud pulse data transmission to generate normalized corrected data; and
   generating SNR corrected data from the mud pulse data transmission utilizing a machine learning mud pulse recognition network (MPRN) and the normalized corrected data as an input to the machine learning MPRN.

2. The method as recited in claim 1, further comprising generating a data transmission overlay mapping utilizing the machine learning MPRN and the normalized corrected data as the input.

3. The method as recited in claim 2, wherein generating the SNR corrected data includes applying the data transmission overlay mapping to the normalized corrected data.

4. The method as recited in claim 1, wherein the processing includes averaging the mud pulse data transmission using a moving time window, determining a corrected data utilizing the averaging and the mud pulse data transmission, and generating the normalized corrected data by normalizing the corrected data.

5. The method as recited in claim 4, wherein a length of the moving time window is determined by a received input parameter that is modified by one or more environmental parameters of the borehole.

6. The method as recited in claim 4, wherein the determining the corrected data includes subtracting a running average from the averaging of the mud pulse data transmission.

7. The method as recited in claim 1, wherein the obtaining includes receiving, from the mud pulser located in the borehole, the mud pulse data transmission at a transducer.

8. The method as recited in claim 1, further comprising transmitting the SNR corrected data to a decoder.

9. The method as recited in claim 8, further comprising:
   cleaning the SNR corrected data utilizing a classification of an output of the machine learning MPRN to generate a clean corrected data; and
   decoding the clean corrected data utilizing the decoder.

10. The method as recited in claim 8, further comprising decoding the SNR corrected data at the decoder and using the decoded SNR corrected data in a well system operation.

11. A computer program product having a series of operating instructions stored on a non-transitory computer-readable medium that directs a data processing apparatus when executed thereby to perform operations to decode mud pulse data transmissions, the operations comprising:
   obtaining a mud pulse data transmission from a mud pulser located in a borehole;
   processing the mud pulse data transmission to generate normalized corrected data; and
   generating SNR corrected data from the mud pulse data transmission utilizing a machine learning mud pulse recognition network (MPRN) and the normalized corrected data as an input to the machine learning MPRN.

12. The computer program product as recited in claim 11, the operations further comprising selecting one or more preambles from the normalized corrected data and training the machine learning MPRN utilizing the one or more preambles.

13. The computer program product as recited in claim 12, wherein the training uses big data machine learning utilizing recorded data retrieved at an end of a drilling job or operation segment.

14. The computer program product as recited in claim 13, wherein the big data machine learning correlates neural network training with environment parameters of the borehole.

15. The computer program product as recited in claim 12, wherein the recorded data is communicated to the mud pulser at the end of the drilling job or the operation segment.

16. The computer program product as recited in claim 11, the operations further comprising generating a data transmission overlay mapping utilizing the machine learning MPRN and the normalized corrected data as the input.

17. The computer program product as recited in claim 16, wherein generating the SNR corrected data includes applying the data transmission overlay mapping to the normalized corrected data.

18. The computer program product as recited in claim 11, wherein the processing includes averaging the mud pulse data transmission using a moving time window, determining a corrected data utilizing the averaging and the mud pulse data transmission, and generating the normalized corrected data by normalizing the corrected data.

19. The computer program product as recited in claim 18, wherein a length of the moving time window is determined by a received input parameter that is modified by one or more pulse parameters of the mud pulse data transmission.

20. The computer program product as recited in claim 18, wherein the determining the corrected data includes subtracting a running average from the averaging of the mud pulse data transmission.

* * * * *